Oct. 29, 1957
H. M. RAY
2,811,276
LIFE SAVER TACKLE BOX
Filed Aug. 19, 1955
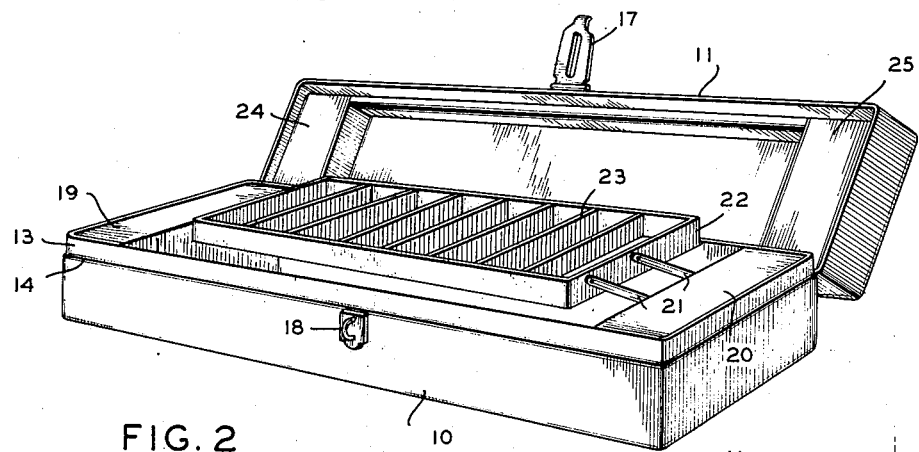
FIG. 1
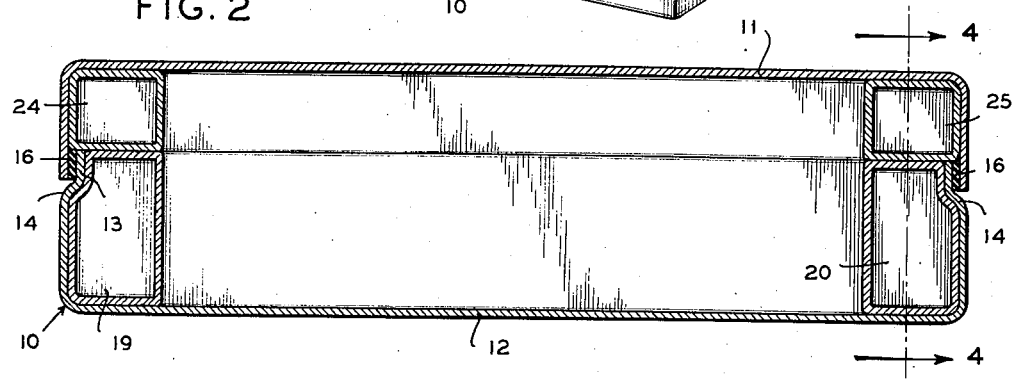
FIG. 2
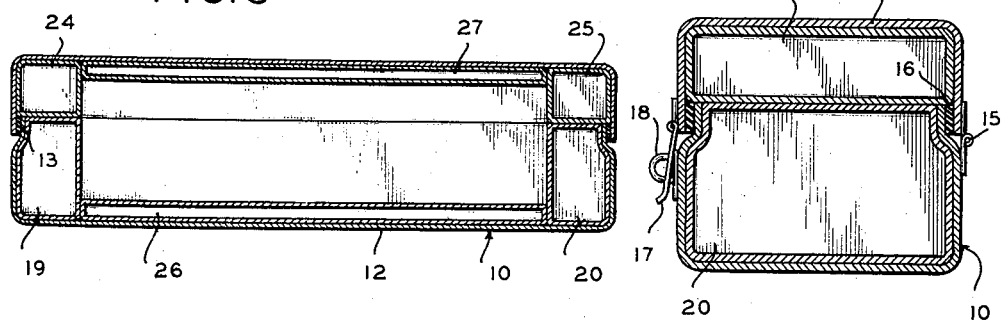
FIG. 3
FIG. 4
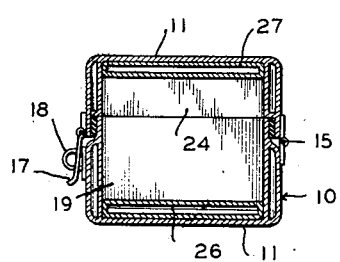
FIG. 5
INVENTOR
HENRY M. RAY
BY *A. Yates Dowell*
ATTORNEY

United States Patent Office 2,811,276
Patented Oct. 29, 1957

2,811,276

LIFE SAVER TACKLE BOX

Henry M. Ray, Mobile, Ala.

Application August 19, 1955, Serial No. 529,514

3 Claims. (Cl. 220—10)

This invention relates to the snaring and catching of untamed life, including that of a marine character such as fish, and to the equipment employed in the accomplishment thereof.

The invention further relates to the storage and handling of the equipment in order to maintain it available for use and so that it will not sink in the water where it cannot be recovered, as well as to provide buoyancy and the prevention of drowning in water of a depth greater than the height of a person using the same.

Tackle boxes have not been satisfactory because they were not water-tight and consequently the contents could be injured by the water and being heavy they would sink in water and would add weight to the fisherman so that he would find it more difficult to swim and would more readily sink in the water. Furthermore the equipment did not provide for ready access to its contents and was otherwise cumbersome, unhandy, and difficult to use.

It is an object of the invention to overcome the objectionable features above enumerated and to provide a sealed tackle box of simple and inexpensive construction in which the contents will be protected from the weather and from water, as well as a tackle box having air tight compartments along its sides or its inner surfaces so that it will float and will serve as a life saver or preserver.

Other objects and advantages of the invention will be apparent from the following description taken in conjunction with the accompanying drawing, wherein:

Fig. 1 is a perspective of a tackle box in accordance with the present invention with its lid open to reveal its contents;

Fig. 2, a longitudinal section of the tackle box with its lid closed;

Fig. 3, a similar section but with the top and bottom provided with air chambers;

Fig. 4, a transverse section through one of the end compartments; and

Fig. 5, a transverse vertical section of a modification of a tackle box according to the present invention.

Briefly stated, the present invention comprises a tackle box of substantially rectangular form the upper portion of which is pivoted to the lower to provide a cover with an annular gasket between the upper and lower sections to render the tackle box air and water tight.

A sealed air space is provided along the bottom, top side, and end walls, the box being formed of metal, plastic, wood, Fiberglas or other material and of any other desired shape, with the units which form the chambers along the bottom, top, and end walls individually sealed and at the same time individually removable so the capacity of the box may be increased by removing certain of the air chambers. A hasp and a staple or other locking means may be provided for a lock to maintain the box in closed position.

With continued reference to the drawing the present invention comprises a substantially rectangular container or tackle box 10 and a substantially rectangular cover 11 of a size corresponding to that of the box 10. The box 10 has a bottom 12 and a reduced upper edge 13 with a shoulder 14 connecting the reduced edge to the remainder of the box, and against which shoulder the edge of the top abuts when in closed position. The top is attached to the box by means of one or more hinges 15.

The box and cover are preferably made of relatively heavy sheet metal preferably of aluminum or other lightweight material although as stated the box may be manufactured from plastic, wood, Fiberglas or other material.

In order to provide buoyancy, a gasket 16 is used between the overlapping portions of the container and the top, such gasket being adapted to be cemented around the interior of the edge of the top. A hasp 17 and staple 18 may be employed for a lock not shown. The tackle box thus described will float. However, to insure buoyancy in case of failure of the gasket 16 to exclude water, the top, bottom, and end surfaces of the box may be provided with a series of members, each forming an individual air cell and such members being of a size and shape to fit snugly in position.

Within each end of the container is a hollow body of a length to extend the full width of the box, a hollow body 19 at the left and a hollow body 20 at the right end of the box. These, like the other air cell forming members, are air-tight and preferably are filled with helium or other gas which is lighter than air to improve the buoyancy of the device. These air cells 19 and 20 are frictionally held in place although they may be fastened to the inner wall of the box in any desired manner.

Attached to the inner vertical face of the air cells 19 and 20 are a pair of pivoted arms 21, the opposite ends of which are pivoted to a tackle tray 22, such tray having compartment defining partitions 23.

In each end of the top, above the cells 19 and 20 of the bottom, are cells 24 and 25, such cells being of a length corresponding to the width of the top and being frictionally retained within the top or secured therein in any desired manner.

In the bottom and the top are mounted hollow air cell forming members 26 and 27 which likewise may be fastened in position in desired manner, or they may be frictionally held by contact with the sides of the bottom and top and by contact with the respective end cells.

It will be apparent from the foregoing that the tackle box of the present invention is relatively simple and inexpensive and yet not only will properly contain the tackle with which it is attended but it will also float so that loss will be less likely and it will serve as a buoyant for anyone in water.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A tackle box comprising a substantially rectangular container having its upper edge of reduced size, a top of the same general configuration as said container adapted to fit over said reduced portion of said container, hinge means mounting said top on said container, a gasket sealing the joint between said container and top, end cells comprising a hollow air-tight body of a length corresponding to the width of said container and having a bottom, side and top fitting snugly against the bottom, side and along the top of said container at each end of the same, a relatively flat rectangular hollow air-tight body adapted to overlie the bottom of the container between said end cells and to engage the front and rear of the container and said end cells, and a buoyant fluid cell within the top at each end, and a buoyant fluid cell within the upper portion of the top said air cell comprising an intermediate relatively flat body and a buoyant fluid within said air cells.

2. A tackle box of generally elongated rectangular conformation comprising an open top bottom section having the top edge portions of the side walls thereof arranged inwardly of the main portion of such side walls to provide a reduced periphery for the telescopic reception of a cooperating cover section, a cover section having an open bottom and having its side walls spacing corresponding to the side walls of the bottom section, a resilient gasket fixed to the inner periphery of the bottom edge portions of the side walls for cooperation with the top edge portions of the side walls of the bottom section for fluid tight engagement, hinges pivotally mounting the cover section to the bottom section along one side thereof, means to secure the other side of the cover section to the bottom section to provide a closed container, end fluid containing cells in the bottom section of a shape to engage the inner surface of the end walls of such bottom section for keying retention of such cells, end cells in said top section of a size to be received between the gasket and the top wall for keying retention therein, and means to releasably secure said cells in said sections.

3. The invention according to claim 2 in which longitudinal fluid tight cells are provided in at least one of said sections for preventing inward removal of the associated end cells.

References Cited in the file of this patent

UNITED STATES PATENTS

| | | |
|---|---|---|
| 913,379 | Hart | Feb. 23, 1909 |
| 1,513,264 | Oels | Oct. 28, 1924 |
| 1,986,057 | Hockworth | Jan. 1, 1935 |
| 2,097,186 | Hinnenkamp | Oct. 26, 1937 |
| 2,491,002 | Domecke | Dec. 13, 1949 |
| 2,503,490 | Janz | Apr. 11, 1950 |